US012145831B2

(12) United States Patent
Griffioen et al.

(10) Patent No.: US 12,145,831 B2

(45) Date of Patent: Nov. 19, 2024

(54) IN-STORE BEVERAGE CONTAINER FILLING ARRANGEMENT

(71) Applicant: Heineken Supply Chain B.V., Amsterdam (NL)

(72) Inventors: Edwin Johannes Cornelis Griffioen, Amsterdam (NL); Sergei Bogdanov, Novosibirsk (RU); Aleksandr Kudriavtsev, Novosibirsk (RU)

(73) Assignee: Heineken Supply Chain B.V., Amsterdam (NL)

( * ) Notice: Subject to any disclaimer, the term of this patent is extended or adjusted under 35 U.S.C. 154(b) by 95 days.

(21) Appl. No.: 17/760,019

(22) PCT Filed: Mar. 3, 2021

(86) PCT No.: PCT/NL2021/050139

§ 371 (c)(1),
(2) Date: Aug. 3, 2022

(87) PCT Pub. No.: WO2021/177819

PCT Pub. Date: Sep. 10, 2021

(65) Prior Publication Data

US 2023/0064119 A1 Mar. 2, 2023

(30) Foreign Application Priority Data

Mar. 3, 2020 (NL) ..................................... 2025041

(51) Int. Cl.
*B67D 1/08* (2006.01)
*B67D 1/12* (2006.01)

(52) U.S. Cl.
CPC .......... *B67D 1/0888* (2013.01); *B67D 1/0857* (2013.01); *B67D 1/1238* (2013.01); *B67D 2001/1263* (2013.01)

(58) Field of Classification Search
CPC .. B67D 1/0888; B67D 1/0857; B67D 1/1238; B67D 2001/1263; B67D 2210/00031; B67D 2210/00041
See application file for complete search history.

(56) References Cited

U.S. PATENT DOCUMENTS 2,655,858 A * 10/1953 Hamlin ................ B67D 1/1231 222/2
2,776,076 A * 1/1957 Nunn .................. B67D 3/0019 222/83.5

(Continued)

FOREIGN PATENT DOCUMENTS

EP 2199995 A1 * 6/2010 ............... B67D 1/06
WO 94/02359 A1 2/1994

(Continued)

OTHER PUBLICATIONS

Redl, Operating Manual—Silexa Bottle Filler X5M, pp. 1-58.
International Search Report of PCT/NL2021/050139 dated Jun. 17, 2021.

*Primary Examiner* — Donnell A Long
(74) *Attorney, Agent, or Firm* — Banner & Witcoff, Ltd.

(57) ABSTRACT

A consumer operable retail beverage container filling arrangement for use in a retail environment is provided, comprising a housing, a beverage dispensing unit for dispensing a beverage, comprising a retail beverage container holder for receiving and holding a retail beverage container, wherein the beverage dispensing unit is at least partially provided in the housing, a consumer interaction module for receiving a consumer input and generating a consumer control signal based on the received consumer input, and a dispensing controller arranged for receiving the consumer control signal and controlling the beverage dispensing unit to dispense the beverage in accordance with the consumer control signal.

22 Claims, 3 Drawing Sheets

(56) References Cited

U.S. PATENT DOCUMENTS

| | | | | |
|---|---|---|---|---|
| 2002/0030102 | A1 | 3/2002 | Brown | |
| 2014/0151402 | A1 * | 6/2014 | Jannatkhah | A47F 9/00 222/399 |
| 2014/0262899 | A1 * | 9/2014 | Mociak | B65D 51/24 206/459.1 |
| 2016/0297665 | A1 * | 10/2016 | Petermann | B67D 1/1422 |
| 2017/0240405 | A1 * | 8/2017 | Gibson | B67D 1/0406 |
| 2017/0305731 | A1 * | 10/2017 | Kyle | B67D 1/08 |

FOREIGN PATENT DOCUMENTS

| | | | |
|---|---|---|---|
| WO | 2014/183185 | A1 | 11/2014 |
| WO | 2015/053837 | A2 | 4/2015 |

* cited by examiner

100

IN-STORE BEVERAGE CONTAINER FILLING ARRANGEMENT

TECHNICAL FIELD

The various aspects and embodiments thereof relate to a consumer operable bottle filling arrangement for use in a retail environment.

BACKGROUND

In a retail environment, a consumer has a wide selection of bottles and cans filled with beverages, such as beer and cider. These bottles and cans have been filled and sealed at a factory, and are transported in the filled state to the retail environment.

Premium beverages such as craft beers are often supplied in large beverage supply containers, such as kegs which may comprise 10, 30, 50 or more litres of beverage. In these supply containers, the beverage is less vulnerable to spoilage factors such as light and temperature which may degrade the quality and flavour of the beverage.

Commercial devices are available for filling individual growlers from a large supply container. For example, the Pegas CrafTap 3.0 is sold by NPM LLC. With the CrafTap 3.0, an individual growler can be filled from a larger supply container.

SUMMARY

The present aspects aim to provide a retail beverage container filling arrangement for use in a retail environment, which can be operated by a consumer. As such, a retailer can provide the option to the consumer to buy and conveniently take home a beverage dispensed from a large beverage supply container such as a keg. Since the beverage is directly dispensed from the large beverage supply container, beverage of superior quality may be supplied to the consumer compared to the beverage in the factory filled bottle.

The filling procedure of the CrafTap 3.0 is shown in a video which may be retrieved from https://www.youtube.com/watch?v=h7A5y7JCry0, and an operation manual may be retrieved at http://growler-station.com/downloads/pegas/CrafTap%203.0%20Manual.pdf. The filling procedure comprises among others the steps of manually manipulating the height of a pedestal on which the growler is placed, and manual control of a tap and a pressure valve. By operating the pressure valve, gas is vented from the growler, allowing beer to enter. The pressure valve is used to manually control the filling speed, between a low speed which corresponds to no beer and no foam, and a high speed which corresponds to a lot of foam.

In examples, a retail beverage container is a bottle, such as a glass or plastic bottle with for example a screw cap or a crown cork, a can, a bag-in-container for use with home beverage dispensers, or any other type of beverage container usable and portable by a consumer.

The retail beverage container filling arrangement preferably is constructed such that it requires a minimum amount of maintenance and cleaning in particular. Contrary to a factory with a professional bottle filling line, a supermarket as an example of a retail environment does not employ specialised maintenance engineers. Hence, a professional bottle filling line would not be suitable for use in such a supermarket due to the lack of specialised personnel for operating and maintaining the bottle filling line.

A first aspect provides a consumer operable retail beverage container filling arrangement for use in a retail environment, comprising a housing, a beverage dispensing unit for dispensing a beverage, comprising a retail beverage container holder for receiving and holding a bottle, wherein the beverage dispensing unit is at least partially provided in the housing, a consumer interaction module for receiving a consumer input and generating a consumer control signal based on the received consumer input, and a dispensing controller arranged for receiving the consumer control signal and controlling the beverage dispensing unit in accordance with the consumer control signal.

In the context of the first aspect, consumer operable implies that the filling arrangement can be used by a consumer with little to no effort, requiring no special skills or technical knowledge. In examples, the consumer supplies an empty bottle as an example of a retail beverage container to the filling arrangement, which bottle is received by the retail beverage container holder. Next, by providing a consumer input to the consumer interaction module, the bottle can be automatically filled without requiring any further consumer input. Hence, the filling arrangement may be an automatic filling arrangement, wherein the dispensing controller controls the filling process after the consumer has supplied the empty bottle, for example up to the time at which the consumer removes the filled bottle from the filling arrangement.

As an option, the housing may comprise a storage area for storing at least one of a supply beverage container and a pressurised gas source such as a pressurised gas container, In the context of the first aspect, examples of a retail environment are those environments through which consumers navigate to buy products. For example, a supermarket, a shopping mall, a liquor store, a retail outlet of a craft brewery, and a grocery store may be considered as being retail environments.

The housing of the filling arrangement may in examples substantially define the total volume of the entire filling arrangement, and may thus determine the space in the retail environment occupied by the filling arrangement. The filling arrangement may thus be a self-contained system requiring only a source for electrical power, such as a wall socket connected to the power grid. As such, the filling arrangement may be easily placed and moved to and within a retail environment.

The storage area comprised by the housing is arranged for storage of one or more supply beverage containers and one or more pressurised gas containers. Examples of supply beverage containers are kegs, bags, and bag-in-containers, and in examples, such containers may contain 5, 10, 30, 50 or more litres of beverage. Examples of pressurised gas containers are tanks, cylinders and canisters, which in examples contain pressurised $CO_2$. In examples, the storage area may be sufficiently large for storing 2 or more, 4 or more, or even 6 or more supply beverage containers and 1, 2, 3 or more pressurised gas containers.

The beverage dispensing unit may be an assembly of different components required for the dispensing of the beverage. A dispensing line may be provided between one or more supply beverage containers and the beverage dispensing unit allowing a flow path for beverage between the one or more supply beverage containers and the beverage dispensing unit.

In embodiments, the beverage dispensing unit may comprise a retail beverage container sensor for detecting the presence of a retail beverage container in the retail beverage container holder, and generating a detection signal when a retail beverage container is detected, and wherein the dispensing controller is arranged for receiving the detection signal and controlling the beverage dispensing unit to dispense the beverage in accordance with the detection signal.

When the filling arrangement is able to detect the presence of a retail beverage container, the filling process may be further automated. Furthermore, dispensing of beverage without a retail beverage container to dispense in present may be prevented.

A consumer feedback module may be provided, to indicate to the consumer when the presence of a retail beverage container is detected. This may aid the consumer in operating the filling arrangement. The feedback signal provided by the consumer feedback module may for example be visible, audible and/or haptic feedback. In a particular example, a green light as a visible feedback may indicate to the consumer that the presence of a retail beverage container is detected.

The consumer feedback module may also be arranged to provide a particular feedback signal when no retail beverage container is detected. Alternatively, the consumer feedback module may be arranged to provide no feedback signal when no retail beverage container is detected, and thus to only provide a feedback signal when a retail beverage container is detected.

The consumer interaction module is arranged to receive the consumer input and to generate the consumer control signal. In examples, the consumer interaction module comprises one or more buttons or other sensors for receiving a consumer input, a touch screen for receiving a consumer input, a slot for receiving a coin, a payment terminal, any other interaction device or any combination thereof.

The consumer control signal may comprise data related to a type of beverage that is to be dispensed, a particular supply beverage container from which beverage is to be dispensed, a time, a date, a price, a beverage dispensing unit identifier, any other data, or any combination thereof.

In embodiments, the housing comprises a storage area access opening for accessing the storage area and at least one housing door for selectively opening or closing off the storage area access opening. Through the access opening, one or more supply beverage containers and/or pressurised gas containers may be placed in and removed from the storage area, for example for replacing an emptied supply beverage containers with a full supply beverage container, and/or an emptied pressurised gas container with a full pressurised gas container.

In embodiments of the filling arrangement not comprising a storage area for storing at least one of a supply beverage container and a pressurised gas source, the filling arrangement may still comprise at least one housing door. This at least one housing door may be used for selectively preventing access to other components of the filling arrangement, such as electronics comprised by the dispensing controller and/or any other component which a consumer should not be able to have access to.

The at least one housing door may be a hinging door, a sliding door, a shutter, or any combination thereof. In embodiments of the filling arrangement, the housing may comprise two or more housing doors. The at least one housing door may be selectively locked to prevent unauthorised persons, such as the consumers, from accessing the storage area. In embodiments, the beverage dispensing unit is at least partially provided in the housing door. In embodiments comprising more than one beverage dispensing unit, multiple beverage dispensing units may be at least partially provided in a single housing door. When a beverage dispensing unit is at least partially provided in a housing door, when putting the housing door in an opened position, the at least part of the beverage dispensing unit may be moved out of the way for accessing the storage area.

The filling arrangement may comprise a cooling unit for cooling the storage area. For example, the cooling unit may comprise a compressive cooling circuit comprising a compressor and an evaporator. With the cooling unit, the temperature inside the storage area and thus the temperature of a supply beverage container inside the storage area may be controlled.

As a further example, the filling arrangement may comprise a cooling unit arranged for directly cooling a dispensing line through which beverage flows between the supply beverage container and the beverage dispensing unit.

In embodiments, as an option which may be generally combined with other options, the beverage dispensing unit comprises a dispensing unit housing defining a dispensing compartment. Furthermore, the retail beverage container holder may be at least partially provided in the dispensing compartment, and the dispensing unit housing may substantially separate the dispensing compartment from the storage area.

The dispensing compartment is the space in which the retail beverage container is held during filling, by the retail beverage container holder. As such, it is towards and/or into this compartment that the beverage is dispensed. When the dispensing unit housing substantially separates the dispensing compartment from the storage area, it may be at least substantially prevented that dispensed beverage enters the storage area. Hence, it may be at least substantially prevented that the storage area should be cleaned to remove dispensed or spilled beverage.

The dispensing unit housing may comprise a drain, which may in use be provided in a lower area of the dispensing unit housing. When beverage is spilled in the dispensing unit housing, for example when a filled bottle is accidentally mishandled by a consumer, spilled beverage can exit the dispensing unit housing via the drain.

During the filling process, it may be required to prevent the consumer from accessing the retail beverage container, the beverage dispensing unit, or specific parts of the beverage dispensing unit. As such, the filling arrangement may comprise a dispensing compartment door for selectively opening or closing off the dispensing compartment. The dispensing compartment door may be provided with a locking mechanism, which locking mechanism may be controllable by the dispensing controller.

Any beverage dispensing unit comprised by the filling arrangement may comprise a beverage level sensor for providing a level sensor signal indicative of a beverage level inside a retail beverage container held by the retail beverage container holder, and wherein the dispensing controller is further arranged for receiving the level sensor signal and for controlling the beverage dispensing unit according to the level sensor signal. When the level sensor signal is indicative of the retail beverage container being sufficiently filled, based on this level sensor signal, the dispensing controller may stop dispensing of the beverage.

When using a beverage level sensor to obtain data indicative of a beverage level inside the retail beverage container during filling thereof, this beverage level sensor may be placed outside the flow path of the beverage, i.e. outside the retail beverage container and the dispensing line. This may prevent contact between the beverage and the sensor, and may reduce the need for cleaning and/or maintaining the sensor.

As an example, the beverage level sensor is an optical sensor. The optical sensor comprises one or more light sources aimed such that at least part of the emitted light passes through a part of a retail beverage container held in the retail beverage container holder. Provided in the path of at least part of the emitted light that has passed through the retail beverage container is a light sensor arranged to receive this light and to generate a beverage level signal based on the received light. Light emitted by the one or more light source may be visible light, electromagnetic radiation outside the visible spectrum, or any combination thereof. The one or more light sources may be arranged to emit light of a particular spectrum, which spectrum may be tuned based on the type of retail beverage container used.

When the beverage level inside the retail beverage container rises above the light path of the light passing through the retail beverage container, one or more properties of the light received by the light sensor changes. These properties may be for example light intensity and the frequency spectrum of the light. This change may be indicative to the light sensor that a particular beverage level is reached.

In embodiments, the position of the beverage level sensor relative to the retail beverage container holder may be varied. This allows a different particular beverage level in the retail beverage container to be detected.

As an option, embodiments of the filling arrangement may further comprise a label printer and a label printer controller, wherein the label printer controller is arranged to receive at least part of the consumer control signal and to control the label printer based on at least part of the consumer control signal. As such, before or after the retail beverage container has been filled, for example the consumer can place the label on the retail beverage container.

The label may be a pre-printed label, or at least part of the label may be printed in the filling arrangement, for example based on at least part of the consumer control signal. For example, the particular type of beverage dispensed, a filling data and/or best before data, any other data related to the dispensed beverage such as the brewing data, a price, any other data or any combination thereof may be printed on the label.

To decrease the amount of required cleaning of the filling arrangement, a disposable dispensing line may be used between the supply beverage container and the beverage dispensing unit. This disposable dispensing line may be disposed of when disconnecting the supply beverage container from the beverage dispensing unit. When connecting a new supply beverage container, a new, clean supply beverage container may be connected to the beverage dispensing unit.

In particular, in embodiments, the beverage dispensing unit may comprise a dispensing line connector comprising a first dispensing line engagement element arranged to engage a disposable dispensing line at a first position of the dispensing line. The dispensing line connector preferably uses a clamp, snap-fit, any other type connection which requires no tools for disconnection, or any combination thereof. As such, disconnecting a used dispensing line and connecting a new dispensing line to the beverage dispensing unit may be made very convenient, such that an employee of a retail environment may perform the disconnecting and connecting without requiring specialised knowledge.

When the filling arrangement comprises the dispensing line connector, and the disposable dispensing line comprises an outlet end, the first position of the dispensing line may be provided on the outlet end, the retail beverage container holder may be arranged to hold the retail beverage container in a first orientation, and the dispensing line connector may be oriented such that the outlet end is oriented at a second orientation for dispensing the beverage under a third orientation, which third orientation is at an angle relative to the first orientation. When the third orientation is at an angle relative to the first orientation, beverage may be dispensed against an inner wall of the retail beverage container.

When the filling arrangement comprises a dispensing line which is arranged to be used more than once, the beverage dispensing unit may comprise a dispensing outlet, a supply beverage container coupler, and a dispensing line providing a flow path for beverage between the supply beverage container and the dispensing outlet. The retail beverage container holder may then be arranged to hold the retail beverage container in a first orientation, and the dispensing outlet is oriented to dispense beverage in a second orientation at an angle relative to the first orientation.

By virtue of an angle between the first orientation and the second orientation, beverage may be dispensed against an inner wall of the retail beverage container, when the retail beverage container for example is a bottle or can. Dispensing against an inner wall of the retail beverage container may prevent or at least partially prevent undesired foaming of the beverage.

The filling process may be a counter-pressure filling process. As such, the beverage dispensing unit may comprise a pressure unit arranged to receive pressurised gas from a pressurised gas container and to provide the pressurised gas to a retail beverage container held in the retail beverage container.

Particularly in embodiments of the filling arrangement comprising the pressure unit, the filling arrangement may further comprise a container sealing mechanism comprising a sealing mechanism body comprising a sealing surface arranged to form a gas tight seal with a part of a beverage container held in the beverage container to create a pressure chamber with the beverage container.

The filling arrangement may comprise a pressure sensor for measuring a pressure inside the pressure chamber, which is indicative for the pressure inside the retail beverage container. The pressure sensor may provide a pressure sensor signal indicative of the measured pressure, and the dispensing controller may be arranged to receive this pressure sensor signal.

The dispensing controller may be arranged to compare a pressure value represented by the pressure sensor signal and indicative of a pressure in the pressure chamber to a threshold value and provide a signal having different values—either analogue, digital or binary—if the pressure in the pressure chamber is higher than the threshold, equal to the threshold or lower than the threshold. As a further option, the pressure value may be compared to multiple thresholds and provide further signals with further values.

A second aspect provides a method for filling a retail beverage container, comprising, by a consumer interaction module, receiving a consumer input and generating a consumer control signal based on the received consumer input, by a retail beverage container sensor, detecting a presence of a retail beverage container in a retail beverage container holder and sending a detection signal based on the detection, by a dispensing controller, receiving the consumer control signal and the detection signal, and based on the consumer control signal and the detection signal, controlling a beverage dispensing unit to dispense a beverage into the retail beverage container.

In an embodiment of the method, the beverage is dispensed against an inner wall of the retail beverage container.

This may decrease the foaming of the beverage when dispensed into the retail beverage container.

In a further embodiment of the method, further comprising by a pressure unit, increasing a pressure in the retail beverage container up to a pre-determined pressure level, by a gas flow sensor, determining a volume of gas provided to the retail beverage container during the increase in pressure, estimating, by the dispensing controller, a volume available for dispensing in the retail beverage container, comparing, by the dispensing controller, the estimated volume available for dispensing to a pre-determined required volume available for dispensing, and based on the comparison, by the dispensing controller, controlling the beverage dispensing unit to dispense the beverage into the retail beverage container.

The filling arrangement may thus comprise a gas flow sensor for determining a volume of gas provided to the retail beverage container during the increase in pressure. The gas flow sensor may be provided anywhere between a pressurised gas source and the pressure unit. Such gas flow sensor may be a sensor detecting a gas flow. In another embodiment, the gas flow sensor may comprise a sensor providing an indication of gas flowing—including detection of a status of a valve in the gas providing circuit—and a clock circuit. With a known gas flow level and/or a gas pressure level and time lapsed during flowing of gas, an amount of gas provided may be determined and with a known pressure in the container, the total volume of gas in the container may be determined.

If the pressure unit is unable to increase the pressure in the retail beverage container up to the pre-determined pressure level, the dispensing may be aborted because a gas-tight seal may not have been obtained.

If the pressure has increased the pressure in the retail beverage container up to the pre-determined pressure level, the volume of gas provided to the retail beverage container or to the pressure chamber created by the retail beverage container and the sealing mechanism body can be determined by the gas flow sensor.

Using the pre-determined pressure level, optionally an ambient pressure measured by an ambient pressure sensor, and the volume of gas provided to the retail beverage container, the dispensing controller may estimate the volume of the retail beverage container available for dispensing beverage into.

This volume available for dispensing in the retail beverage container may be dependent on an inner volume of the retail beverage container, but also by the volume of matter inside this inner volume of the retail beverage container, prior to the dispensing process. This foreign matter may comprise earlier dispensed beer, cleaning liquid, any other undesired liquid or solid mass, or any combination thereof.

If foreign matter is inside the inner volume of the retail beverage container provided by the consumer, the estimated volume available for dispensing in the retail beverage container provided by the consumer will be lower than a volume available for dispensing in a retail beverage container having substantially the same inner volume, but without foreign matter present in the inner volume.

In practice, by first determining the volume available for dispensing in the retail beverage container, it may be prevented that too much beverage is dispensed, which may result in an overflowing retail beverage container. Furthermore, it may be prevented that beverage is dispensed into an already partially filled retail beverage container—either filled with the intended beverage or with matter not intended to be present.

In examples, the volume available for dispensing in the retail beverage container may be used by the dispensing controller to determine the type and/or size of the retail beverage container provided by the consumer to the filling arrangement. The dispensing controller may comprise a memory with stored thereon data related to one or more retail beverage containers, which data may be indicative of the type and/or size of the retail beverage container.

If the estimated volume available for dispensing in the retail beverage container falls within a particular range indicative of a particular type and/or size of retail beverage container, the dispensing controller may control the beverage dispensing unit in accordance with the particular type and/or size of retail beverage container and/or the label printer controller may print a particular label in accordance with the particular type and/or size of retail beverage container. If the estimated volume does not fall within one of the ranges, this may be indicative of foreign matter being present in the retail beverage container.

The volume may be estimated by comparing the pressure value to one or more threshold values. If the pressure value is within a pre-determined range from a first threshold value, the container is determined to be empty and to have a first volume associated with the first threshold value. Likewise, if the pressure value is within a pre-determined range from a second threshold value, the container is determined to be empty and to have a second volume associated with the second threshold value. If the pressure value is outside the pre-determined ranges, the dispensing controller may determined that a non-suitable or non-empty container is placed. The container may be filled with an amount of beverage in accordance with a particular known size of the container associated with a volume determined to be available in the container Especially when the optical level sensor is used, the dispensing controller may be provided with a maximum dispensing time. If the optical level sensor does not provide a signal indicative of the retail beverage container being sufficiently filled, the dispensing controller may stop the dispensing of beverage after expiring of the maximum dispensing time.

In a further embodiment, the method comprises comparing, by the dispensing controller, the estimated volume available for dispensing to data in a dataset comprising data indicative of a type and/or size of one or more retail beverage containers and, by the dispensing controller, controlling the beverage dispensing unit based on the comparison to dispense beverage into the retail beverage container.

For example, the dispensing controller may be programmed with a maximum dispensing time. This maximum dispensing time may depend on the type and/or size of the retail beverage container. Hence, the maximum dispensing time may be based on the estimated volume.

DESCRIPTION OF THE FIGURES

In the figures.

DETAILED DESCRIPTION OF THE FIGURES

Figure 1:
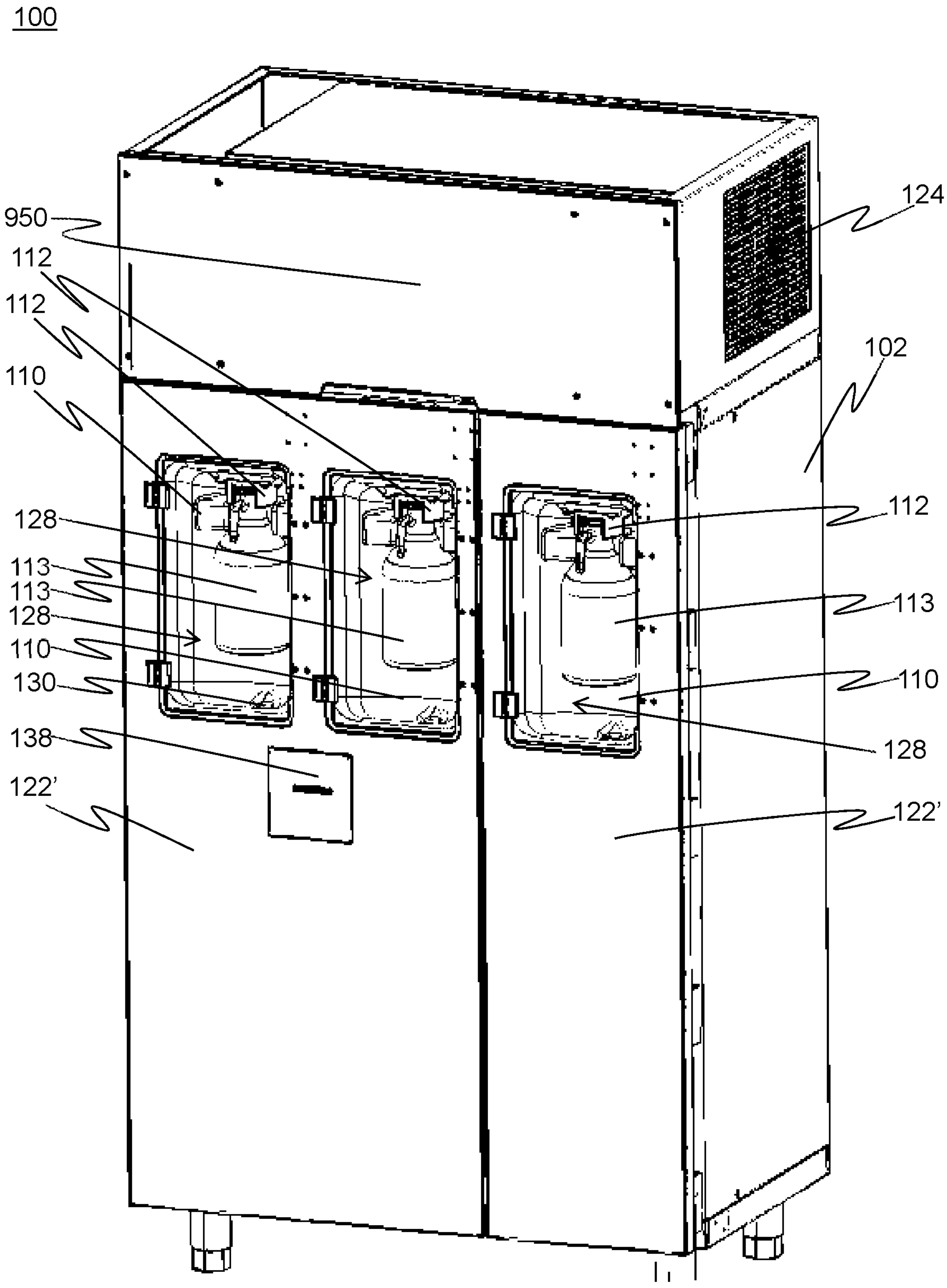
FIG. 1 shows an embodiment of a consumer operable retail beverage container filling arrangement for use in a retail environment.

FIG. 1 shows an embodiment of a consumer operable retail beverage container filling arrangement 100 for use in a retail environment. The filling arrangement 100 comprises a housing 102. The housing 102 comprises a left housing door 122' and a right housing door 122". The left housing door 122' and a right housing door 122" together close off a storage area of the housing 102. The left housing door 122' and right housing door 122" are hingedly attached to the housing 102, such that they can both open outwardly to open a storage area access opening.

The left housing door 122' is provided with two beverage dispensing units 110, and the right housing door 122" is provided with a single beverage dispensing unit 110. When opening a housing door, any beverage dispensing unit 110 provided in the respective housing door is moved away from the position as shown by FIG. 1 such that it does not block the storage area access opening.

The filling arrangement 100 comprises, as an option, a display 950 for displaying information to a consumer using the filling arrangement 100. As a further option, the filling arrangement 100 comprises a label printer 138, which in this particular embodiment is provided in the left housing door 122'. As an even further option, the housing comprises a cooling unit, of which a condenser 124 is visible in FIG. 1. The condenser 124 may be used as a heat exchanger with the surroundings of the filling arrangement 100 for cooling the storage area of the housing 102.

As a mere example, each beverage dispensing unit 110 comprises a growler holder 112 as a beverage container holder, with in each growler holder 112 a growler 113. The growlers 113 are suspended from the growler holders 112 in a dispensing compartment 128. Each of the dispensing units 110 is provided with a door for closing of the dispensing compartments. The doors are not visible in FIG. 1, as the doors are transparent. At the left of each of the dispensing compartments, FIG. 1 shows hinges for connecting the doors to the applicable housing doors 122. Embodiments of the filling arrangement 100 are envisioned wherein one or more of the dispensing compartments is provided with one or more dispensing compartment doors.

In embodiments, the display 950 is a touch screen and forms part of a consumer interaction module. A touch input provided by the consumer to the touch screen may be used to generate a consumer control signal. Additionally or alternatively, one or more sensors may be provided for detecting the presence of a growler 113 in a growler holder 112, for detecting whether a door such as a housing door 122 and/or a dispensing compartment doors is in an opened or closed state, and/or detecting any other type of consumer interaction with the filling arrangement 100.

For example, when the consumer provides a growler 113 to the growler holder 112, this may be regarded as a consumer interaction with the device and thus as a consumer input, and may hence be used to at least partially generate the consumer control signal. Presence of a growler 113 in the growler holder 112 may be detected by means of an optical sensor like a light sensor and, optionally, a light sensor, a contact sensor like a button, other, or a combination thereof.

When the consumer opens or closes a dispensing compartment door, this may also be regarded as a consumer interaction with the device and thus as a consumer input, and may hence be used to at least partially generate the consumer control signal. such opening and closing may be detected by means of optical sensors, contact sensors, electromagnetic sensors, other or a combination thereof Thus, in general, the consumer interaction module may comprise any sensor which may detect a consumer interaction with the filling arrangement 100 and any consumer interaction with the filling arrangement 100 may be considered to be a consumer input.

Preferably, to make the filling arrangement 100 particularly consumer operable, the consumer does not need to operate any valves, handles, or any other controls to operate the filling arrangement 100. Hence, as a preference, the consumer only needs to provide an empty beverage container to the retail beverage container holder. The rest of the filling process will then be governed by the dispensing controller.

In a particular example, the housing doors 122 of the filling arrangement 100 are closed. Next, the consumer opens one of the dispensing compartment doors and places a growler 113 into the growler holder 112 associated with the same beverage dispensing unit 110 as the opened dispensing compartment door. After placing the growler 113, the dispensing compartment door is closed, either by the consumer of by the filling arrangement 100 itself, for example using a biasing element forcing the dispensing compartment door in a closed state. The dispensing controller may receive a consumer control signal based on any of these consumer interactions with the filling arrangement 100, including closing of the compartment door, and proceed with filling the growler 113 accordingly.

Figure 2:
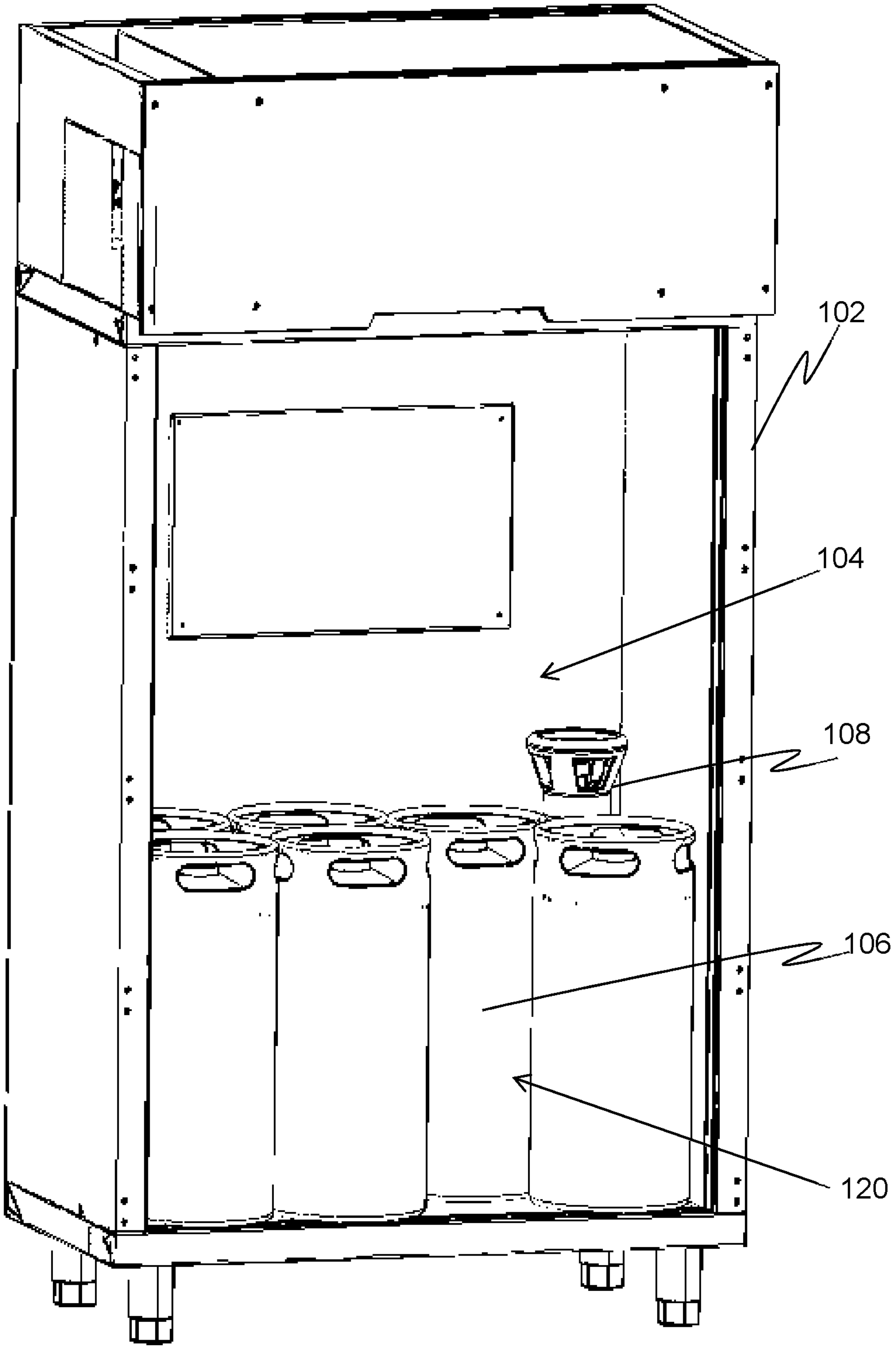
FIG. 2 shows part of an embodiment of a filling arrangement.

FIG. 2 shows part of an embodiment of a filling arrangement 100, wherein the housing doors and beverage dispensing units have been omitted to show the storage area 104 of the housing 102. Shown in the storage area 104 are six kegs 106 and one CO2 cylinder 108. With the housing doors opened, the storage area 104 is accessible via the a storage area access opening 120.

The person skilled in the art will appreciate that the storage area 104 is optional, and when a storage area 104 is comprised by the housing 102, this storage area 104 may be arranged for storing any number of supply beverage containers and/or pressurised gas containers. In other embodiments, a separate storage area 104 for at least one of a supply beverage container and, optionally, a pressurised gas container may be provided outside the housing 102, for example in an external refrigerator. It may be preferred to store the pressurised gas container at ambient temperature, rather than in a cooled cabinet.

Figure 3:
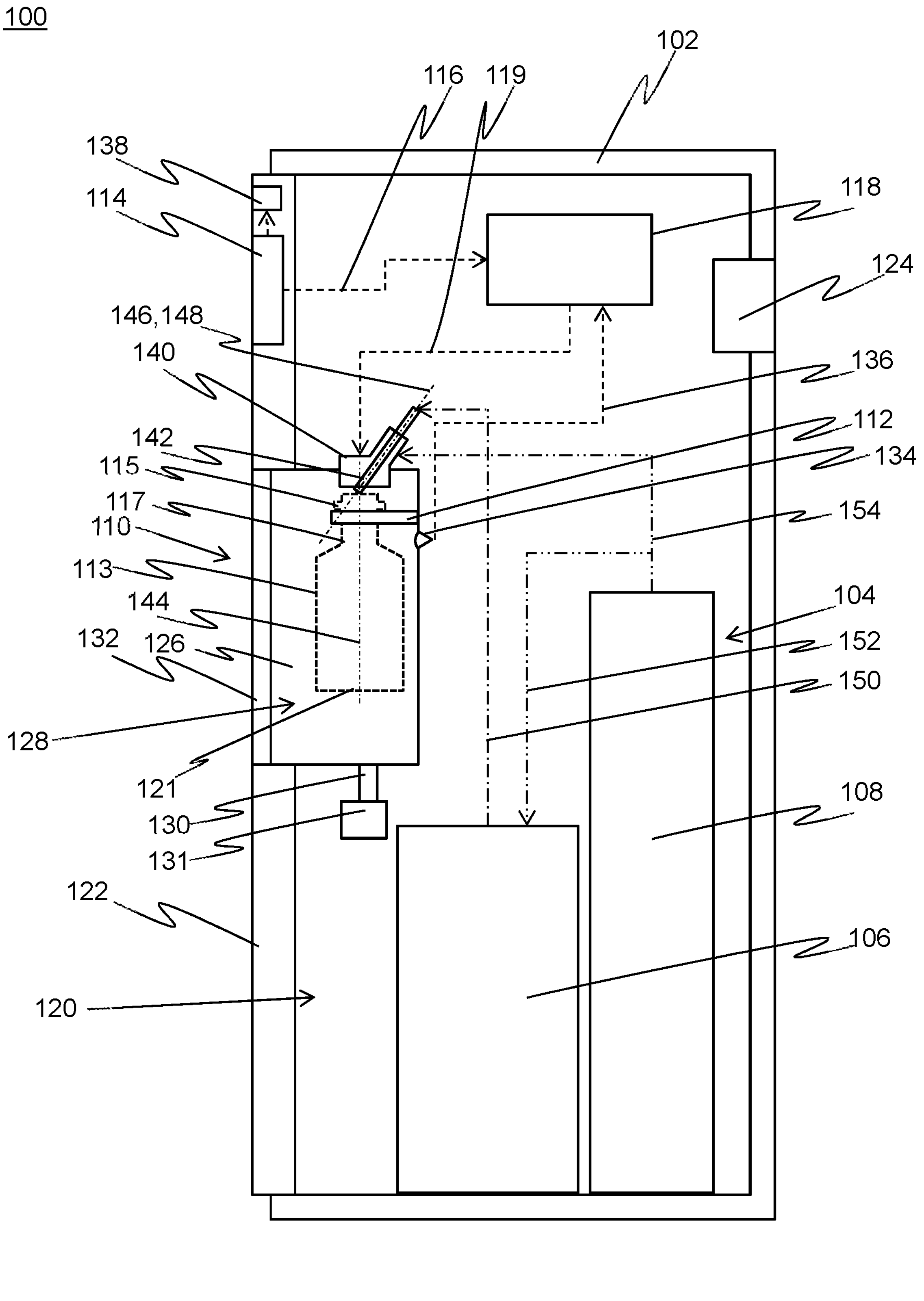
FIG. 3 shows a schematic cross-section of an embodiment of a filling arrangement.

FIG. 3 shows a schematic cross-section of an embodiment of a filling arrangement 100, in particular a consumer operable retail beverage container filling arrangement for use in a retail environment. The filling arrangement 100 comprises a housing 102, in which for this particular embodiment and as an option for other embodiments of the filling arrangement 100, substantially defines the volume occupied by all components of the filling arrangement 100, except for a power cord which is to be plugged into a power outlet of a retail environment.

In these preferred embodiments, the filling arrangement 100 can be placed anywhere in the retail environment as long as sufficient electrical power can be provided to the filling arrangement 100 for operation thereof. The housing 102 may be placed on rollers or wheels for increased movability.

As depicted in FIG. 3, the housing 102 comprises a storage area 104. In the storage area 104 a keg 106 as a supply beverage container and a CO2 cylinder 108 as a pressurised gas source are stored. A dispensing line 150 is provided between the keg 106 and the beverage dispensing unit 110. A gas conduit 152 provides a fluid connection between the CO2 cylinder and the keg 106 for pressurising the beverage inside the keg 106.

As schematically indicated in FIG. 3, the housing 102 comprises a storage area access opening 120 for accessing the storage area 104. The storage area access opening 120 is shown closed off by a housing door 122. The storage area access opening 120 is sufficiently wide and high to allow a retail environment employee to place and remove at least one of the keg 106 and the CO2 cylinder 108 as examples respectively of the supply beverage container and the pressurised gas source. By being able to selectively close off the storage area 104, it may be prevented that the consumer gains access to components of the filling arrangement 100 which the consumer does not need for consumer interaction with the filling arrangement 100, for example any of the keg 106, CO2 cylinder, 108, dispensing controller, and/or any other component comprised by embodiments of the filling arrangement 100.

The filling arrangement 100 depicted in FIG. 3 comprises the optional cooling unit 124 for cooling the storage area 104. The housing 102, or at least part thereof, may be insulated to decrease the energy required for cooling the storage area 104 when the temperature inside the storage area 104 is lower than an ambient temperature surrounding the housing 102.

The beverage dispensing unit 110 as depicted in FIG. 3 comprises the growler holder 112 as the retail beverage container holder which holds the growler 113 as the retail beverage container. In this example, the growler 113 comprises a support flange 115 and the growler 113 is suspended at the support flange 115 by the growler holder 112. The growler holder 112 preferably comprises two protrusions arranged in a wall of the dispensing compartment 128 to support the support flange 115. In other examples, the growler 113 may stand with its bottom on a pedestal comprised by an example of a retail beverage container holder.

As an option depicted in FIG. 3, the consumer interaction module comprises a touch screen 114 for receiving a consumer input and generating a consumer control signal 116 based on the received consumer input.

The filling arrangement 100 further comprises a dispensing controller 118 arranged for receiving the consumer control signal 116 and for controlling the beverage dispensing unit 110 in accordance with the consumer control signal. As such, the dispensing controller 118 may generate and send a dispensing module control signal 119 and the beverage dispensing unit 110 may be arranged to receive the dispensing module control signal 119 and dispense beverage in accordance with the received dispensing module control signal 119.

As depicted in FIG. 3, the beverage dispensing unit 110 may comprise a dispensing unit housing 126 defining a dispensing compartment 128. The growler holder 112 is provided in the dispensing compartment 128, and as such a growler 113 held by the growler holder 112 may be provided in the dispensing compartment 128 as well. The growler holder 112 is arranged to hold the growler 113 in a first orientation indicated with reference numeral 144, which may correspond to an axial direction of the growler 113.

By virtue of the dispensing unit housing 126, the dispensing area 128 as depicted in FIG. 3 is substantially separated from the storage area 104. Hence, it may be prevented that any beverage dispensed into the dispensing area 128 reaches the storage area 104. It will be obvious that preferably all beverage is dispensed into a retail beverage container. However, if some beverage is spilled in the dispensing unit housing 126, a drain 130 is provided as an option. The drain 130 may be provided at the bottom of the dispensing unit housing 126, and the drain 130 may be provided with a reservoir 131 for receiving drained beverage. This reservoir may be easily removable from the filling arrangement 100 to dispose of any spilled beverage.

To prevent a consumer from interacting with a retail beverage container during the filling process, access to the dispensing area 128 may be restricted by the dispensing compartment door 132 for selectively opening or closing off the dispensing compartment.

As an option, applicable when the filling arrangement 100 comprises a dispensing compartment door 132, the filling arrangement 100 may comprise a dispensing compartment door locking mechanism for locking the dispensing compartment door. When locked, the dispensing compartment door cannot be opened by the consumer. The locking mechanism may be an automatic locking system governed by the dispensing controller 118. The dispensing controller 118 may for example be arranged to lock the locking mechanism before starting filling of the retail beverage container, and to unlock the locking mechanism when the filling process has ended such that the consumer can safely open the dispensing compartment door to remove the filled retail beverage container from the retail beverage container holder 112.

As a further option also applicable in other embodiments of the filling arrangement 100, the filling arrangement 100 comprises a beverage level sensor 134. The beverage level sensor 134 may be a part of the beverage dispensing unit 110. The beverage level sensor 134 is arranged to provide a level sensor signal 136 indicative of a beverage level inside the growler 113 as the retail beverage container held by the growler holder 112.

When the filling arrangement 100 comprises a beverage level sensor 134, the dispensing controller 118 may be further arranged for receiving the level sensor signal 136 and for controlling the beverage dispensing unit 110 according to the level sensor signal. For example, when the level sensor signal 136 is indicative of a sufficiently filled retail beverage container, the dispensing controller 118 may control the beverage dispensing unit 110 to stop dispensing beverage.

The beverage level sensor 134 may be embodied as an optical sensor, optionally in combination with a light source, arranged to look through the growler 113, for example through a neck section 115 of the growler 113. In other embodiments, the beverage level sensor 134 may be embodied as an in-line flow sensor, as a weight sensor for measuring the weight of the retail beverage container during filling, or as any other sensor arranged to obtain information indicative of a beverage level inside the retail beverage container during filling. As a further alternative, a timer may be used to specify a specific filling time.

To provide the consumer with a label to paste on a filled retail beverage container, as an option, the filling arrangement 100 depicted in FIG. 3 comprises the label printer 138 which may be accompanied by a label printer controller. The label printer controller may control the label printer based on for example at least part of the consumer control signal.

The dispensing line 150 may be connected to a dispensing line connector 140 of the beverage dispensing unit 110. The dispensing line 150 may be a fixed dispensing line intended for use with a plurality of kegs 106, and may hence comprise a coupler to connected to a keg 106. In other embodiments, the dispensing line 150 may be a disposable dispensing line.

Regardless of whether the dispensing line 150 is disposable or not, the dispensing line connector 140 may be arranged to hold or at least orient an outlet end 142 of the dispensing line 150 in a second orientation indicated with reference numeral 146. The second orientation 146 may be at an angle relative to the first orientation 144 at which the growler holder 112 holds the growler 113.

By virtue of the outlet end 142 being oriented at the second orientation 146, beverage may be dispensed under a third orientation 148, which third orientation 148 may be parallel to the second orientation 146. The third orientation 148 is provided at an angle relative to the first orientation 144, and as such the dispensing direction may intersect a side wall of the growler 113. When the third orientation 148 is provided parallel to the first orientation 144, and thus not at an angle relative to the first orientation 144, the dispensing direction intersects the growler 113 at a bottom 121 of the growler 113.

Embodiments of the filling arrangement 100, for example the filling arrangement 100 depicted in FIG. 3, may be arranged for counter-pressure filling of a retail beverage container. The pressurised gas used for the counter-pressure filling process may originate from the pressurised gas source provided in the storage area 104. As such, a filling pressure gas conduit 154 may be provided between the CO2 cylinder 108 and the beverage dispensing unit 110. As such, the beverage dispensing unit 110 of FIG. 3 is arranged to receive pressurised gas via the filling pressure gas conduit 154.

The invention claimed is:

1. A consumer operable retail beverage container filling arrangement for use in a retail environment, comprising:
- a housing,
- a beverage dispensing unit for dispensing a beverage, comprising a retail beverage container holder for receiving and holding a retail beverage container, wherein the beverage dispensing unit is at least partially provided in the housing;
- a consumer interaction module for receiving a consumer input and generating a consumer control signal based on the received consumer input; and
- a dispensing controller arranged for receiving the consumer control signal and controlling the beverage dispensing unit to dispense the beverage in accordance with the consumer control signal,
- wherein the beverage dispensing unit comprises a dispensing line connector comprising a first dispensing line engagement element arranged to engage a disposable dispensing line at a first position of the disposable dispensing line and for holding the disposable dispensing line.

2. The consumer operable retail beverage container filling arrangement according to claim 1, wherein the beverage dispensing unit comprising a retail beverage container sensor for detecting the presence of a retail beverage container in the retail beverage container holder, and generating a detection signal when a retail beverage container is detected, and wherein the dispensing controller is arranged for receiving the detection signal and controlling the beverage dispensing unit to dispense the beverage in accordance with the detection signal.

3. The consumer operable retail beverage container filling arrangement according to claim 2, further comprising a consumer feedback module arranged to receive the detection signal from the retail beverage container sensor, and to provide a feedback signal to the consumer operating the filling arrangement indicative of the detection signal provided by the retail beverage container sensor.

4. The consumer operable retail beverage container filling arrangement according to claim 1, wherein the beverage dispensing unit comprises a beverage level sensor arranged to provide a level sensor signal indicative of a beverage level inside a retail beverage container held by the retail beverage container holder, and wherein the dispensing controller is further arranged for receiving the level sensor signal and for controlling the beverage dispensing unit according to the level sensor signal.

5. The consumer operable retail beverage container filling arrangement according to claim 4, wherein the beverage level sensor is an optical sensor.

6. The consumer operable retail beverage container filling arrangement according to claim 1, wherein:
- the beverage dispensing unit comprises a dispensing unit housing defining a dispensing compartment;
- the retail beverage container holder is at least partially provided in the dispensing compartment; and
- the dispensing unit housing substantially separates the dispensing compartment from a storage area comprised by the filling arrangement.

7. The consumer operable retail beverage container filling arrangement according to claim 6, wherein the dispensing unit housing comprises a drain.

8. The consumer operable retail beverage container filling arrangement according to claim 6, further comprising a dispensing compartment door for selectively opening or closing off the dispensing compartment.

9. The consumer operable retail beverage container filling arrangement according to claim 8, further comprising a dispensing compartment door locking mechanism for locking the dispensing compartment door in a closed state, wherein the dispensing controller is arranged for selectively locking the locking mechanism.

10. The consumer operable retail beverage container filling arrangement according to claim 1, wherein the housing comprises a storage area for storing at least one of a supply beverage container and a pressurised gas source.

11. The consumer operable retail beverage container filling arrangement according to claim 10, wherein the housing comprises a storage area access opening for accessing the storage area and at least one housing door for selectively opening or closing off the storage area access opening.

12. The consumer operable retail beverage container filling arrangement according to claim 11, wherein the beverage dispensing unit is at least partially provided in the housing door.

13. The consumer operable retail beverage container filling arrangement according to claim 10, further comprising a cooling unit for cooling the storage area.

14. The consumer operable retail beverage container filling arrangement according to claim 1, further comprising a label printer and a label printer controller, wherein the label printer controller is arranged to receive at least part of the consumer control signal and to control the label printer based on at least part of the consumer control signal.

15. The consumer operable retail beverage container filling arrangement according to claim 1, wherein:
- the first position of the dispensing line is provided on an outlet end of the disposable dispensing line;
- the retail beverage container holder is arranged to hold the retail beverage container in a first orientation; and
- the dispensing line connector is oriented such that the outlet end is oriented at a second orientation for dispensing the beverage under a third orientation, which third orientation is at an angle relative to the first orientation.

16. The consumer operable retail beverage container filling arrangement according to claim 1, wherein:
- the beverage dispensing unit comprises a dispensing outlet, a supply beverage container coupler, and a dispensing line providing a flow path for beverage between the supply beverage container and the dispensing outlet;

the retail beverage container holder is arranged to hold the retail beverage container in a first orientation; and the dispensing outlet is oriented to dispense beverage in a second orientation at an angle relative to the first orientation.

17. The consumer operable retail beverage container filling arrangement according to claim 1, wherein the beverage dispensing unit comprises a pressure unit arranged to receive pressurised gas from a pressurised gas container and to provide the pressurised gas to a retail beverage container held in the retail beverage container holder.

18. A method of operating a consumer operable retail beverage container filling arrangement for filling a retail beverage container, comprising:

by means of a consumer interaction module, receiving a consumer input and generating a consumer control signal based on the received consumer input; and by means of a dispensing controller, receiving the consumer control signal, and based on the consumer control signal, controlling a beverage dispensing unit to dispense a beverage into the retail beverage container, wherein the beverage is dispensed from a supply beverage container via a disposable dispensing line provided between the supply beverage container and the beverage dispensing unit.

19. The method according to claim 18, further comprising:

by means of a retail beverage container sensor, detecting a presence of a retail beverage container in a retail beverage container holder and sending a detection signal based on the detection; and by means of a dispensing controller, receiving the consumer control signal and the detection signal;

wherein the controlling the beverage dispensing unit to dispense a beverage into the retail beverage container is also based on the detection signal.

20. The method according to claim 18, further comprising dispensing the beverage against an inner wall of the retail beverage container.

21. The method according to claim 18, further comprising:

by a pressure unit, increasing a pressure in the retail beverage container up to a pre-determined pressure level;

by a gas flow sensor, determining a volume of gas provided to the retail beverage container during the increase in pressure;

estimating, by the dispensing controller, a volume available for dispensing beverage in the retail beverage container;

comparing, by the dispensing controller, the estimated volume available for dispensing to a pre-determined required volume available for dispensing; and based on the comparison of the estimated volume with the pre-determined required volume available for dispensing, by the dispensing controller, controlling the beverage dispensing unit to dispense the beverage into the retail beverage container.

22. The method according to claim 21, further comprising:

comparing, by the dispensing controller, the estimated volume available for dispensing to data in a dataset comprising data indicative of a type and/or size of one or more retail beverage containers; and controlling, by the dispensing controller, the beverage dispensing unit based on the comparison to dispense beverage into the retail beverage container.

* * * * *